United States Patent [19]
Ingerstedt et al.

[11] 3,938,281
[45] Feb. 17, 1976

[54] GERMINATION AND SEEDLING PROMOTING ASSEMBLY

[75] Inventors: Sven Ake Ingerstedt, Simrishamn; Arne Nils Lantz, Asbro, both of Sweden

[73] Assignee: Hasselfors Bruks Aktiebolag, Hasselfors, Sweden

[22] Filed: Feb. 21, 1974

[21] Appl. No.: 444,308

[52] U.S. Cl. .................... 47/37; 47/34.13; 224/48 F
[51] Int. Cl.² .......................................... A01C 11/00
[58] Field of Search ............... 47/34.13, 31, 56, 1.2; 224/48 A, 48 F, 48 N

[56] References Cited
UNITED STATES PATENTS

| | | | |
|---|---|---|---|
| 2,155,688 | 4/1939 | Schubel | 224/48 F |
| 3,362,106 | 1/1968 | Goldring | 47/56 |
| 3,375,607 | 4/1968 | Melvold | 47/37 |
| 3,543,438 | 1/1968 | Edwards | 47/34.13 |
| 3,810,329 | 5/1974 | Lecuru | 47/34.13 |

Primary Examiner—Stephen C. Pellegrino
Attorney, Agent, or Firm—Hill, Gross, Simpson, Van Santen, Steadman, Chiara & Simpson

[57] ABSTRACT

A germination and seedling promoting assembly comprising a plurality of individual moisture absorbant compressed peat bodies each having one or more seeds, and a supporting member designed to support said peat bodies at minor portions only of the under surfaces thereof whereas the remaining major portions of the under surfaces of the peat bodies are left exposed. The supporting member is plate shaped and is formed from a thin sheet of plastic, and it has shallow troughs, defined by upwardly protruding ridges and having the major portion of the bottoms thereof removed. The ridges are adapted to hold the peat bodies closely spaced but out of contact with each other, also after moisture absorption and attendant expansion of the peat bodies. A special support frame is provided to support the plate shaped supporting members side by side out of ground contact and in a manner to permit stacking of such support frames.

5 Claims, 3 Drawing Figures

GERMINATION AND SEEDLING PROMOTING ASSEMBLY

FIELD OF THE INVENTION

This invention relates to the combination of a flat with individual moisture-absorbent bodies, each having a seed therein, for germinating such seed and promoting the growth of the resulting seedling.

BACKGROUND OF THE INVENTION

In the past a plurality of different types of germination and seedling promoting units have been proposed, in which one or another type or combination of peat is utilized as a moisture absorbing mass. In some cases the peat is compressed to form a small disc later receptive of the seeds and is normally surrounded by a confining cover, such as of a sheet material of plastic or in the shape of a netting. As the compressed peat is moistened it expands up to the limits as set by the confining cover, and the germination and start up of the seedling takes place in the moistened peat body. Frequently, the peat discs with the seeds are spread out over the final planting site prior to their activation by being moistened, but in certain instances it is preferred to let the germination and start up of the seedling to take place indoors, such as in a greehouse or in some other sheltered place, and the seedlings are planted later at the growth locality.

In the first mentioned case, i.e. when the germination and start up of the seedlings takes place at the final planting site, there are reasons for spreading out the peat discs with their seeds only during certain predetermined periods of the year, in order to ensure as advantageous moistening and climate conditions as possible, but in such cases certain problems may arise, such as attacks of rodents on the ungerminated seeds.

In the second case, i.e. when the germination and start up of the seedlings takes place at a sheltered place, the just mentioned limitations and problems are circumvented, but there still remains a drawback which is common to both of the cases, viz. that the confining covering around the peat disc has an adverse effect on the root system of the seedling and may cause a root twisting or in some cases a root strangulation.

OBJECTS OF THE INVENTION

One important object of the invention has been to circumvent the above mentioned limitations and drawbacks of the prior art germination and seedling promoting units by providing a germination and seedling promoting assembly with a minimum of root-confining elements.

A further object of the invention has been to provide a germination and seedling promoting assembly which promotes the development of a strong and richly branched out root system of the seedlings.

Another important object of the invention has been to provide a germination and seedling promoting assembly which easily lends itself to mechanical planting of the seedlings.

Still another important object of the invention has been to provide a special support frame to support the germination and seedling promoting assemblies side by side out of ground contact and in a manner to permit stacking of such support frames.

SUMMARY OF THE INVENTION

According to the invention there is provided a germination and seedling promoting assembly comprising a plurality of individual moisture absorbant bodies each having one or more seeds, and a supporting member or flat adapted to support said individual moisture absorbant bodies only at minor portions of the under surfaces thereof whereas the remaining major portions of the under surfaces of said moisture absorbant bodies are left exposed, said supporting member or flat further being adapted to support said individual moisture absorbant bodies closely spaced but out of contact with each other.

Preferably, the individual moisture absorbant bodies are rectangular or square discs or cakes of compressed peat which discs may be made to be about cube-shaped after moisture absorption and attendant expansion.

In a preferred embodiment the supporting member or flat is formed from a thin sheet of plastic, for instance, and has shallow troughs or pockets, defined by upwardly protruding ridges and having the major portion of the bottoms thereof removed.

A special support frame may be used to support the support members out of ground contact.

BRIEF FIGURE DESCRIPTION

In order that the invention may be clearly understood, it will now be described, by way of example, with reference to the accompanying drawings, wherein.

DESCRIPTION OF PREFERRED EMBODIMENTS

Figure 1:
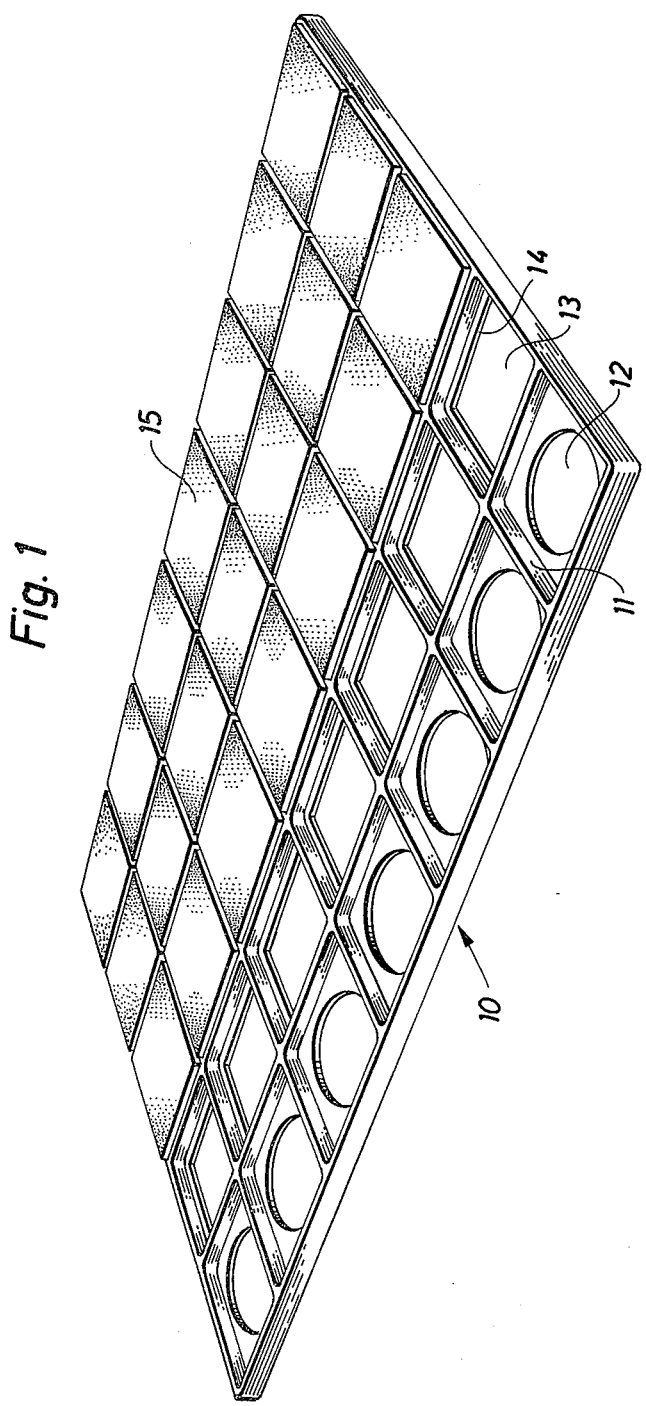
FIG. 1 is a perspective view of a supporting plate or flat, carrying a plurality of still unactivated disc-shaped peat bodies.

With reference to FIG. 1 the support plate or flat 10 in this example is made from a thin sheet of plastic and has been formed, such as by vacuum forming, with a grid of ridges 11 of a height of 3–6 millimeters, for instance. The ridges define shallow troughs or pockets, each having the major portion of the bottom thereof removed, viz. either in that each bottom has a circular hole 12 or a rectangular hole 13 so that each trough or pocket has a comparatively narrow supporting bottom ledge 14. Each one of these shallow troughs of the support plate 10 is adapted to accomodate a preferably rectangular or square body 15 of compressed peat. The compressed peat body 15 contains one or more seeds already as it is placed onto the support plate. The peat may be of the fertilized type.

Figure 2:
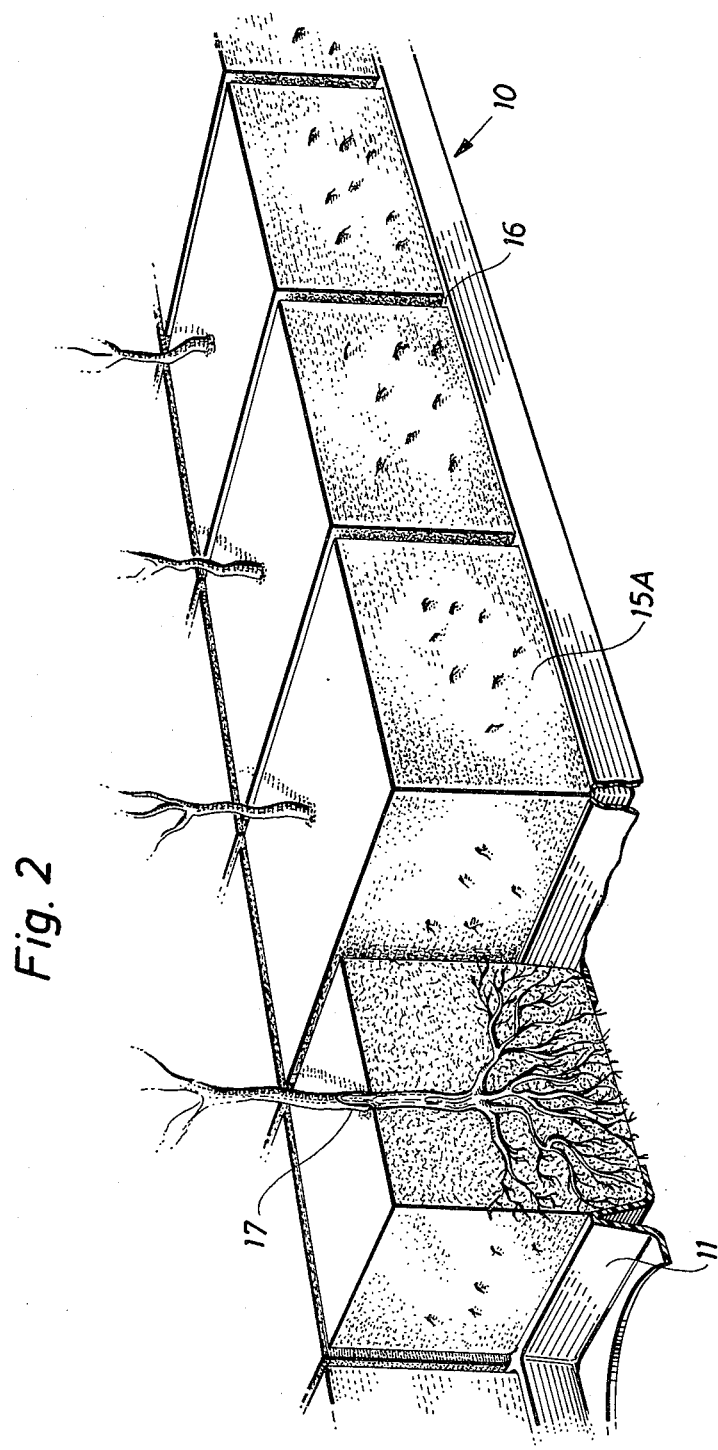
FIG. 2 shows, in enlarged scale, a portion of the supporting plate or flat, carrying some activated peat bodies.

As is shown in FIG. 2 the ridges 11 should preferably be formed so as to be slightly narrower upwardly. The width of the ridges 11 should be so dimensioned in relation to the size and properties of the peat bodies 15 that the moistened and expanded bodies 15A, FIG. 2, do not contact each other while still the slot 16 between them is as narrow as possible. It is very important that the slot betwen adjacent expanded peat bodies 15A is as small as possible, in as much as the air within the slot is then left almost fully immobilized whereby an objectionable quick drying is prevented.

When the peat bodies 15 are activated by moistening thereof they expand and the seeds germinate to give seedlings 17. Then, the root systems of the seedlings branch out sidewardly and downwardly, and the finest root threads end immediately outside the side and bottom surfaces of the peat body 15A, as they cannot grow in air. Due to the fact that the length of the finest root threads will be limited in a natural manner, without mechanical confines, the seedlings will branch off new root threads which grow strong so as to form a strong and richly branched out root system.

When the actual planting is to take place it is easy to take the peat body 15A from the support plate 10, and to put it into or onto suitable soil. In the course of such planting no disturbance whatsoever to the root system of the seedling will occur.

The size of the peat body 15 and the properties thereof, such as the degree of compression, fertilization etc, are chosen with due regard to the kind of seedling which is to be planted, and the shape of the peat bodies 15 is determined by the configuration of the pockets of the support plate 10.

The size of the support plate 10, and the number of peat bodies 15 on each plate may vary. It is also possible to make the support plate 10 very large or as a continuous web, and to provide the plate or web with weakenings or perforations to permit tearing off of pieces of a suitable size for the actual use.

Figure 3:
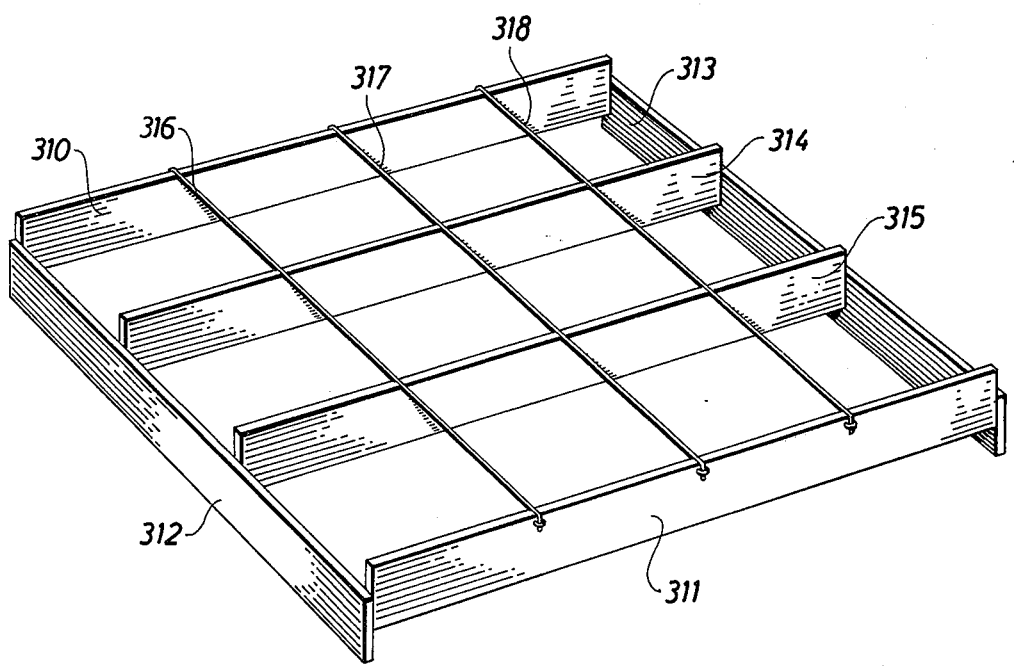
FIG. 3 is a perspective view of a supporting frame which is advantageously used with the germination and seedling promoting assembly according to the invention.

Now, with reference to FIG. 3 there is shown therein a support frame comprising four frame portions 310, 311, 312 and 313, preferably made of wood. The dimensions of the frame may be 108 × 108 centimeters, for instance. For convenience, all frame portions may have the same cross-sectional dimensions. As shown in the drawing, two opposite frame portions 310, 311 are preferably connected to the other two frame portions 312, 313 in a position slightly higher than that of the last mentioned ones, so that the frame portions are mutually guided and interlocked as the support frames are stacked one upon the other.

Parallel to the frame portions 310, 11 and between these there are disposed a pair of support battens 314, 315 the ends of which are secured to the frame portions 312, 313. These support battens 314, 315 are similarly made of wood, and may have the same cross-sectional dimensions as those of the frame portions 310, 311.

A number of strings 316, 317, 318, such as iron wires of 3 millimeters diameter, extend between the frame portions 310, 311 and cross over the support battens 314, 315. These strings are parallel to each other and are equally spaced mutually and with respect to the frame portions 312, 313. Small wood battens could also be used, instead of the iron wires.

In use of the support frame, support plates or flats 10 of the kind shown in FIGS. 1 and 2 are placed on the rectangular fields as formed by the frame portions, the support battens and the strings, with at least two opposite edges of the support plates 10 resting on said frame portions, support battens and strings, as the case may be. The support frames may rest on the ground, side by side, or may they be stacked one upon the other, at least during the germination period.

After a certain period of time, when the seedlings or small plants are ready to be transported to the final location where planting is to take place, the frames are stacked one upon the other to form a stack comprising ten frames, for instance. In this stack, the frame portions 310, 311, 312, 313 form jointly the sides of a box-like structure, which may be closed upwardly, if desired, such as by means of a plastic hood or the like. It will be appreciated that air circulation and attendant drying out of the peat bodies will be eliminated in as much as the sides of the box-like structure are closed, as is, in most cases, also the upper side of the said box-like structure. Therefore, the peat bodies with their seedlings or plants may be left at the planting site for very extended periods without risk of drying.

It will be realized that the young seedlings or plants will be kept very well protected against damage both during transportation thereof and during storing at the planting site. Further, on planting, it is very easy to separate the individual seedlings or plants from each other in that first the individual support plates or flats are lifted from the support frames, and then the individual peat bodies with their seedlings or plants are taken from the respective support plates.

Oblique wood battens may be nailed on to the "box-sides" to stabilize the box-like structures for transport. To further stabilize the support frames when stacked the frame sides may be provided with guide abutments or ridges which extend into adjacent underlying or overlying support frame.

Besides providing a good protection during the germination and first growth period of the plants, the support frame as described above, if made of wood, also offers the advantage of eliminating the need for handling return package material. This is because the frames are so cheap that they may simply be burned when emptied. Not even the iron wires present any problems, as they corrode away comparatively soon.

What we claim is:
1. A germination and seedling promoting assembly comprising:
  a. a plurality of individual moisture-absorbent bodies having a water content too low to initiate seed germination;
  b. at least one ungerminated seed disposed in each of said bodies;
  c. a support member having a plurality of shallow pockets respectively snugly receiving at least the lower portion of said bodies, the bottom of each said pocket being apertured to expose more than half but less than all of the under surface of its said body to atmosphere, said pockets being in proximity to the adjacent ones of said pockets;
  d. a rectilinear support frame having four side portions of equal height, a pair of opposite ones of said portions being vertically offset from the other pair of said portions; and
  e. means secured to certain of said portions for supporting said support member with said bodies thereon, out of contact with the surface that the lower of said pair is resting;

whereby another similar support frame may be supported on the upper side of said lower pair, and whereby said side portions of a plurality of stacked support frames jointly define a substantially closed box-like structure.

2. An assembly according to claim 1 in which said pockets have side walls that are uniformly spaced from the side walls of the adjacent pockets, as seen in plan view.

3. An assembly according to claim 1 in which said pockets have rectilinear side walls as seen in plan view.

4. An assembly according to claim 1 in which said support member is a flat made of thin formed sheet material.

5. An assembly according to claim 1 in which the spacing between adjacent pockets is such that their said absorbent bodies, after being moistened, will be closely spaced but remain out of contact with each other.

* * * * *